United States Patent [19]
Edison

[11] 3,824,969
[45] July 23, 1974

[54] ELECTRONIC FUEL INJECTION SYSTEM
[75] Inventor: Lamonte R. Edison, Kokomo, Ind.
[73] Assignee: General Motors Corporation, Detroit, Mich.
[22] Filed: Nov. 24, 1972
[21] Appl. No.: 309,259

[52] U.S. Cl. ........................ 123/32 EA, 123/119 R
[51] Int. Cl. .......................................... F02m 51/00
[58] Field of Search ............................. 123/32, 119

[56] References Cited
UNITED STATES PATENTS
3,522,794  8/1970  Reichardt ..................... 123/32 EA
3,702,601  11/1972 Gordon et al. ................. 123/32 EA Primary Examiner—Laurence M. Goodridge
Assistant Examiner—Cort Flint
Attorney, Agent, or Firm—T. G. Jagodzinski

[57] ABSTRACT

An internal combustion engine includes a group of eight fuel injectors for applying fuel to the engine. A set of four first order timing signals are developed in synchronization with engine operation. The set of first order timing signals collectively contain eight magnitude permutations per engine cycle each defining the start of injection for a corresponding one of the fuel injectors. The set of four first order timing signals is mixed to form a first set of four second order timing signals, which is mixed to form a second set of two second order timing signals, which is mixed to form a third set of four second order timing signals, which is mixed to form a single third order timing signal containing all eight magnitude permutations per engine cycle. A single third order pulse train is developed in synchronization with the single third order timing signal. The single third order pulse train contains eight control pulses per engine cycle each initiated in response to one of the eight magnitude permutations per engine cycle in the single third order timing signal. The length of each control pulse defines the period of injection for a corresponding one of the fuel injectors in time compressed nonoverlapping relationship. The single third order pulse train is separated in response to the third set of second order timing signals to form a set of four second order pulse trains collectively containing all eight control pulses per engine cycle. The length of each control pulse in the set of second order pulse trains is extended to define the period of injection for a corresponding one of the fuel injectors in time expanded overlapping relationship. The set of second order pulse trains is separated in response to the set of first order timing signals to form a series of eight first order pulse trains each containing control pulses which are applied to energize a corresponding one of the group of eight fuel injectors.

1 Claim, 7 Drawing Figures

ELECTRONIC FUEL INJECTION SYSTEM

This invention relates to an electronic fuel injection system including eight fuel injectors for successively applying fuel to an engine in overlapping time relationship during each engine cycle. More particularly, the invention is an improvement upon the electronic fuel injection system disclosed in U.S. Pat. application Ser. No. 152,088.

According to the invention, an internal combustion engine includes a group of fuel injectors for applying fuel to the engine when individually energized in a given injection order once during each engine cycle. A set of four first order timing signals $A_1$, $A_2$, $A_3$ and $A_4$ is developed in synchronization with engine operation. The first order timing signals $A_1$–$A_4$ each have alternate level transitions spaced at intervals of one-half engine cycle within each of the timing signals and displaced at intervals of one-eighth engine cycle between each of the timing signals.

A first set of four second order timing signals $B_1$, $B_2$, $B_3$ and $B_4$ are produced in response to the set of first order timing signals $A_1$–$A_4$. The first set of second order timing signals $B_1$–$B_4$ are given by the following logical equations:

$$B_1 = A_1 \cdot \overline{A_3}$$
$$B_2 = A_2 \cdot \overline{A_4}$$
$$B_3 = \overline{A_1} \cdot A_3$$
$$B_4 = \overline{A_2} \cdot A_4$$

A second set of two second order timing signals $C_1$ and $C_2$ is produced in response to the first set of second order timing signals $B_1$–$B_4$. The second set of second order timing signals $C_1$ and $C_2$ are given by the following logical equations:

$$C_1 = B_1 + B_3$$
$$C_2 = B_2 + B_4$$

A third set of four second order timing signals $D_1$, $D_2$, $D_3$ and $D_4$ are produced in response to the second set of second order timing signals $C_1$ and $C_2$. The third set of second order timing signals $D_1$–$D_4$ are given by the following logical equations:

$$D_1 = C_1 \cdot \overline{C_2}$$
$$D_2 = C_1 \cdot C_2$$
$$D_3 = \overline{C_1} \cdot C_2$$
$$D_4 = \overline{C_1} \cdot \overline{C_2}$$

A single third order timing signal E is produced in response to the third set of second order timing signals $D_1$–$D_4$. The third order timing signal E is given by one of the following logical equations:

$$E = D_1 + D_3$$
$$E = D_2 + D_4$$

A single third order pulse train F is produced in synchronization with the third order timing signal E. The pulse train F contains eight control pulses per engine cycle initiated at intervals of one-eighth engine cycle in response to a different one of the eight level transitions per engine cycle in the timing signal E. The duration of each of the control pulses in the pulse train F is determined as a function of at least one engine operating parameter up to a maximum duration of approximately one-eighth engine cycle. A set of four second order pulse trains $G_1$, $G_2$, $G_3$ and $G_4$ are produced in response to the third order pulse train F and in response to the third set of second order timing signals $D_1$–$D_4$. The set of second order pulse trains $G_1$–$G_4$ is given by the following logical equations:

$$G_1 = F \cdot D_1$$
$$G_2 = F \cdot D_2$$
$$G_3 = F \cdot D_3$$
$$G_4 = F \cdot D_4$$

The duration of the control pulses within the set of second order pulse trains $G_1$–$G_4$ is extended by a maximum factor of four (4) to provide a set of four second order pulse trains $G_1'$, $G_2'$, $G_3'$ and $G_4'$ each containing control pulses having a maximum duration of approximately one-half engine cycle. A series of eight first order pulse trains $H_1$, $H_2$, $H_3$, $H_4$, $H_5$, $H_6$, $H_7$ and $H_8$ are produced in response to the set of second order pulse trains $G_1'$–$G_4'$ and in response to the set of first order timing signals $A_1$–$A_4$. The series of first order pulse trains $H_1$–$H_4$ is given by the following logical equations:

$$H_1 = G_1' \cdot A_1$$
$$H_2 = G_2' \cdot A_2$$
$$H_3 = G_3' \cdot A_3$$
$$H_4 = G_4' \cdot A_4$$
$$H_5 = G_1' \cdot \overline{A_1}$$
$$H_6 = G_2' \cdot \overline{A_2}$$
$$H_7 = G_3' \cdot \overline{A_3}$$
$$H_8 = G_4' \cdot \overline{A_4}$$

The series of first order pulse trains $H_1$–$H_8$ are applied to corresponding ones of the group of fuel injection units to energize the fuel injection units for the duration of the control pulses in the pulse trains $H_1$–$H_8$.

These and other aspects and advantages of the invention will become more apparent by reference to the following detailed description of a preferred embodiment when considered in conjunction with the accompanying drawings.

Figure 1:
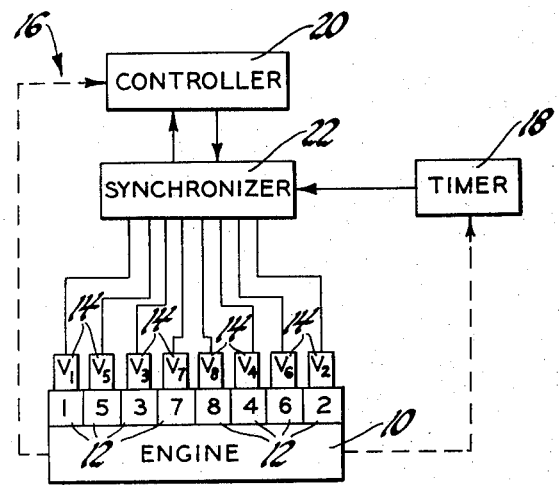
FIG. 1 is a block diagram of an electronic fuel injection system incorporating the principles of the invention.

Referring to FIG. 1, an internal combustion engine 10 includes a group of eight cylinders 12 numbered 1 through 8. Preferably, the engine 10 is a V-8 having a first bank of cylinder 1-3-5-7 and a second bank of cylinders 2-4-6-8. An ignition system (not shown), which conventionally includes a spark coil, a spark distributor and spark plugs, defines the firing order of the cylinders 12 during each engine cycle. For the sake of convenience, it is assumed that the firing order of the cylinders 12 is 1-2-3-4-5-6-7-8 per engine cycle. A group of eight fuel injectors 14 identified $V_1$ through $V_8$ are mounted on the engine 10 for individually applying fuel to corresponding ones of the eight cylinders 12 once during each engine cycle. The fuel injectors 14 may be mounted for direct communication with the cylinders 12 or for indirect communication with the cylinders 12 through the intake manifold (not shown). In synchronization with the firing order of the cylinders 12 per engine cycle, the injection order of the fuel injectors 14 is $V_1$-$V_2$-$V_3$-$V_4$-$V_5$-$V_6$-$V_7$-$V_8$ per engine cycle. A fuel supply system (not shown) which conventionally includes a fuel tank, a fuel pump and a pressure regulator, is connected to the fuel injectors 14 for providing fuel at a constant pressure. The fuel injectors $V_1$-$V_8$ are successively energized in the injection order during each engine cycle by an electronic fuel injection control system 16 to individually apply fuel to the cylinders 1–8 in overlapping time relationship.

The electronic fuel injection control system 16 includes a timer 18, a controller 20 and a synchronizer 22. The timer 18 is connected between the engine 10 and the synchronizer 22 for providing timing information defining the start of injection for each of the fuel injectors 14 per engine cycle. The controller 20 is connected between the engine 10 and the synchronizer 22 for providing control information defining the period of injection for each of the fuel injectors 14 per engine cycle. The synchronizer 22 is connected with each of the fuel injectors 14 for energizing the fuel injectors 14 at time instants determined by the timer 18 and for the time durations determined by the controller 20. More particularly, the synchronizer 22 successively energizes the fuel injectors $V_1$-$V_8$ in the injection order with control pulses each starting at a time instant defined by timing information received from the timer 18 and each having a time duration defined by control information received from the controller 20. The fuel injectors $V_1$-$V_8$ are each responsive to the application of a control pulse to inject fuel to a corresponding one of cylinders 1–8 at a constant rate for the duration of the control pulse.

Figure 2:
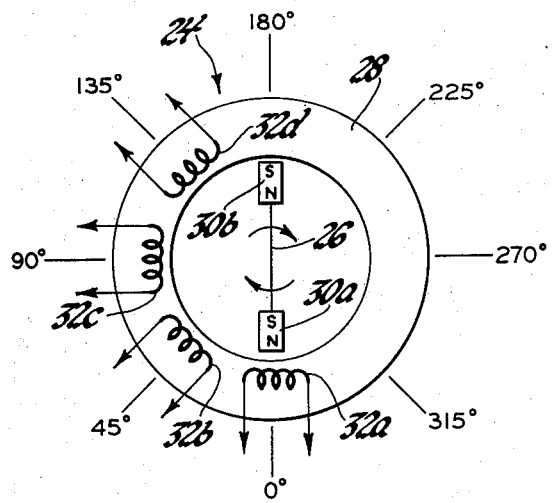
FIG. 2 is a schematic diagram of a pick-up transducer utilized by the invention.

Referring to FIG. 2, the timer 18 is preferably provided by an electromagnetic pick-up transducer 24 including a rotor 26 and a stator 28. The rotor 26 is supported at a centerpoint for 360° rotation in a clockwise direction with respect to the stator 28. A pair of permanent magnets $30_a$ and $30_b$ are mounted on opposite ends of the rotor 26. A group of four windings $32_a$, $32_b$, $32_c$ and $32_d$ are mounted on the stator 28. The permanent magnets $30_a$ and $30_b$ are oppositely poled with respect to the windings $32_a$-$32_d$. The permanent magnet $30_a$ presents a north pole to the windings $32_a$-$32_d$ while the permanent magnet $30_b$ presents a south pole to the windings $32_a$-$32_d$.

In operation, the rotor 26 is driven relative to the stator 28 in synchronization with the operation of the engine 10 so that the rotor 26 makes one complete revolution per engine cycle. Hence, the angle markings to the outside of the stator 28 indicate successive 45° increments in both the position of the rotor 26 and the cycle of the engine 10. The windings $32_a$-$32_d$ are located at peripheral points on the stator 24 successively spaced at angles of 45° with respect to the centerpoint of the rotor 26. Specifically, the winding $32_a$ is located at the 0° point, the winding $32_b$ is located at the 45° point, the winding $32_c$ is located at the 90° point and the winding $32_d$ is located at the 135° point. As the rotor 26 is turned relative to the stator 28, the permanent magnets $30_a$ and $30_b$ are alternately carried into and out of electromagnetic coupling relationship with the windings $32_a$-$32_d$ so as to produce a corresponding set of four input signals $W_1$-$W_4$ as shown in FIG. 3.

Figure 3:
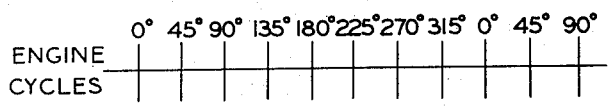
FIG. 3 is a graphic diagram of several waveforms useful in explaining the operation of the pick-up transducer.
Figure 3:
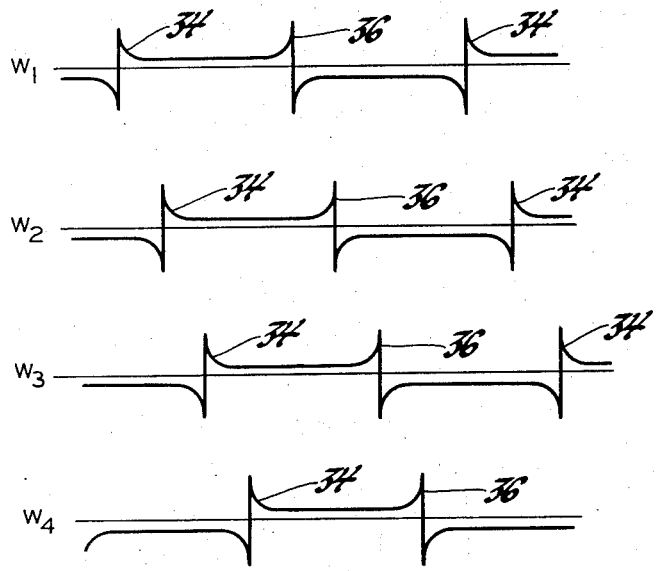

Referring to FIGS. 2 and 3, the input signals $W_1$-$W_4$ each include alternate first and second pulse pairs 34 and 36. The first pulse pairs 34 are developed in the input signals $W_1$-$W_4$ as the permanent magnet $30_a$ successively sweeps past the windings $32_a$-$32_d$, respectively. Alternately, the second pulse pairs 36 are developed in the input signals $W_1$-$W_4$ as the permanent magnet $30_b$ successively sweeps past the windings $32_a$-$32_d$. The first pulse pairs 34 each exhibit a shape negative-to-positive polarity transition while the second pulse pairs 36 each exhibit a sharp positive-to-negative polarity transition. The negative-to-positive polarity transitions in the first pulse pairs 34 of the input signals $W_1$-$W_4$ successively occur at the 0° point, the 45° point, the 90° point and the 135° point in each engine cycle, respectively, as the centerline of the permanent magnet $30_a$ successively aligns with the centerlines of the windings $32_a$-$32_d$, respectively. Similarly, the positive-to-negative polarity transitions in the second pulse pairs 36 of the input signals $W_1$-$W_4$ successively occur at the 180° points, the 220° points, the 270° points and the 315° points in each engine cycle, respectively, as the centerline of the permanent magnet $30_b$ successively aligns with the certerlines of the windings $32_a$-$32_d$, respectively.

For demonstration purposes, it is assumed that each 360° engine cycle is coextensive with the injection order of the fuel injectors $V_1$-$V_8$. That is, the beginning or 0° point of each engine cycle coincides with the start of injection for the first fuel injector $V_1$ in the injection order. Accordingly, the negative-to-positive polarity transitions in the first pulse pairs 34 of the input signals $W_1$-$W_4$ define the start of injection for the fuel injectors $V_1$-$V_4$ in the first half of the injection order, respectively. Conversely, the positive-to-negative polarity transitions in the second pulse pairs 36 of the input signals $W_1$-$W_4$ define the start of injection for the fuel injectors $V_5$-$V_8$ in the second half of the injection order, respectively.

A more detailed description of the illustrated pick-up transducer 24 may be obtained by reference to U.S. Pat. No. 3,606,869. However, it is to be noted that various alterations and modifications may be made to the pick-up transducer 24 without affecting the invention. For example, the windings $32_a$-$32_d$ may be replaced by Hall effect resistors or any other suitable electromagnetic signal generating devices. Further, the electromagnetic transducer 24 may be entirely replaced by a multiple contact relay switch, a photoelectric transducer or some other equivalent arrangement.

Before preceeding to a detailed description of the synchronizer 22, an introduction to the logic concepts employed within the synchronizer 22 is in order. Specifically, the synchronizer 22 comprises logic components including inverters, flip-flops, AND gates, OR gates and multipliers for manipulating logic signals including square waves and pulse trains. The bilevel logic signals utilized by the synchronizer 22 periodically shift between high and low levels. More particularly, the logic signals exhibit alternate high-to-low level transitions and low-to-high level transitions. As used herein, the high levels of the logic signals represent a logic 1 or true state while the low levels of the logic signals represent a logic 0 or false state. However, it is to be noted that the 1 and 0 designations of the high and low levels are purely arbitrary and may be reversed without affecting the logical relationships between the logic signals.

Figure 4:
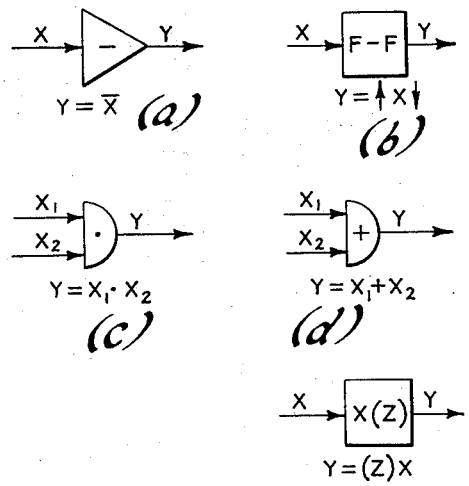
FIG. 4 is a schematic diagram of several logic devices utilized by the invention.

As used herein, an inverter is a logic device for providing an output which represents the inverse of an input. If the input is $X$ and the output is $Y$, the logical function of an inverter may be expressed by the following equation:

$$Y = \overline{X} \tag{1}$$

where the (−) above the $X$ indicates the inverse of $X$. The symbol which will be used to designate an inverter is shown in FIG. 4a. The inverters employed within the synchronizer 22 may be provided by any of the various suitable inverter devices well known in the art.

As used herein, a flip-flop is a logic device for providing an output which shifts to a high level and remains there in response to a low-to-high level transition in an input and which shifts to a low level and remains there in response to a high-to-low level transition in the input. If the input is $X$ and the output is $Y$, the logical function of a flip-flop may be represented by the following equation:

$$Y = \uparrow X \downarrow \tag{2}$$

where the ($\uparrow$) indicates a low-to-high level transition in the input $X$ and the ($\downarrow$) indicates a high-to-low level transition in the input $X$. The symbol which will be used to designate a flip-flop is shown in FIG. 4b. The flip-flops employed within the synchronizer 22 may be provided by any of the various suitable flip-flop or bistable devices well known in the art.

As used herein, an AND gate is a logic device for providing an output which is the logical AND function of at least two inputs. If the inputs are $X_1$ and $X_2$ and the output is $Y$, the logical function of an AND gate may be expressed by the following equation:

$$Y = X_1 \cdot X_2 \tag{3}$$

where the (·) indicates the logical AND function. The symbol which will be used to denote an AND gate is shown in FIG. 4c. The AND gates employed within the synchronizer 22 may be provided by any of the various suitable AND gate devices well known in the art.

As used herein, an OR gate is a logic device for providing an output which is the logical OR function of at least two inputs. If the inputs are $X_1$ and $X_2$ and the output is $Y$, the logical function of an OR gate may be expressed by the following equation:

$$Y = X_1 + X_2 \tag{4}$$

where the (+) indicates the logical OR relationship. The symbol which will be used to designate an OR gate is shown in FIG. 4d. The OR gates employed within the synchronizer 22 may be provided by any of the various suitable OR gate devices well known in the art.

As used herein, a multiplier is a logic device for providing an output which extends or multiplies the time period during which an input is in a particular logic condition by a predetermined factor. If the input is $X$ and the output is $Y$ and the predetermined factor is $Z$, the logical function of a multiplier may be expressed by the following equation:

$$Y = (Z)X \tag{5}$$

The symbol which will be used to designate a multiplier is shown in FIG. 4e. The multipliers employed within the synchronizer 22 may be provided by any of the various suitable multiplier devices well known in the art.

Figure 5:
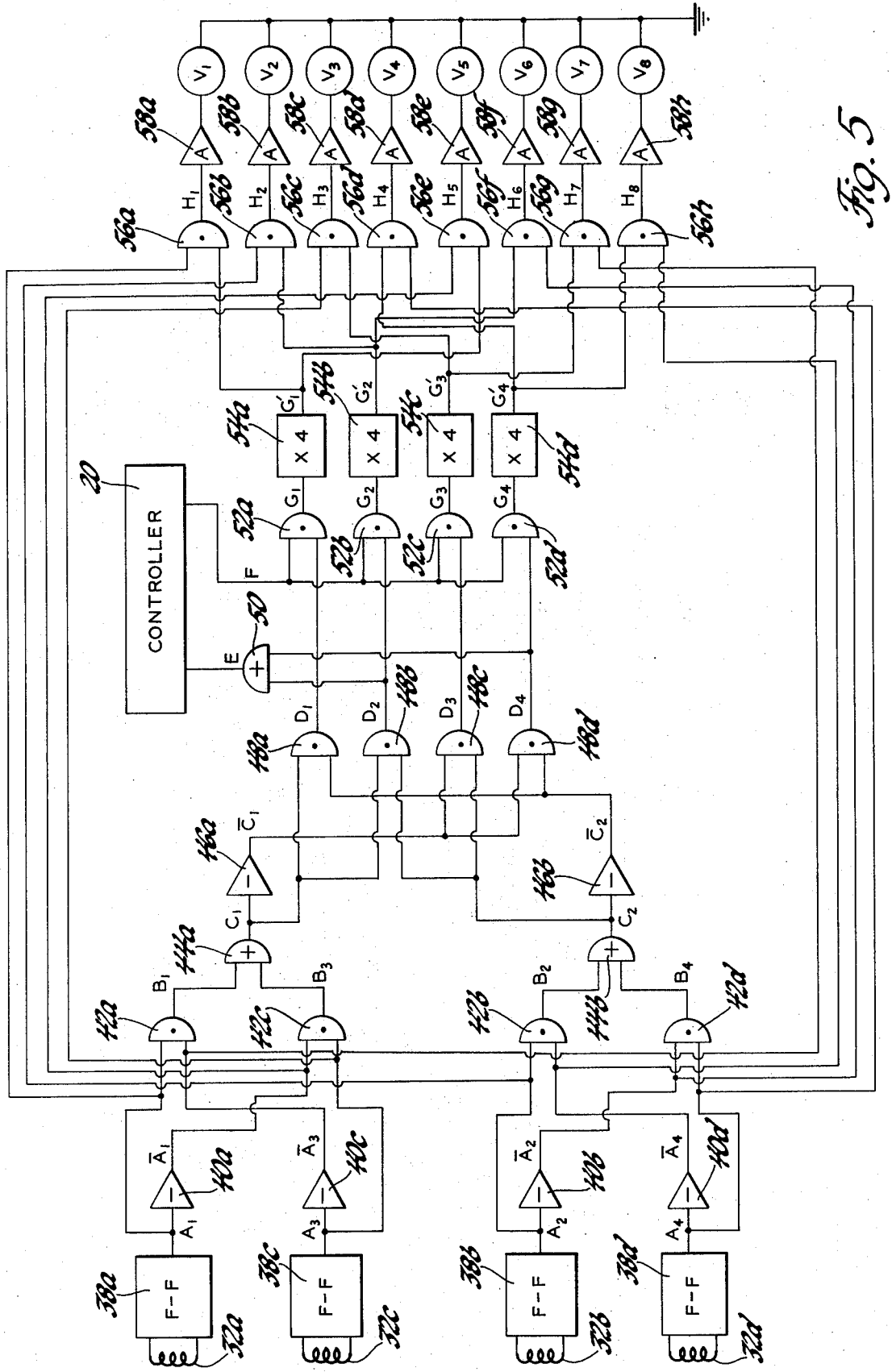
FIG. 5 is a schematic diagram of an electronic fuel injection system incorporating the principles of the invention.
Figure 6:
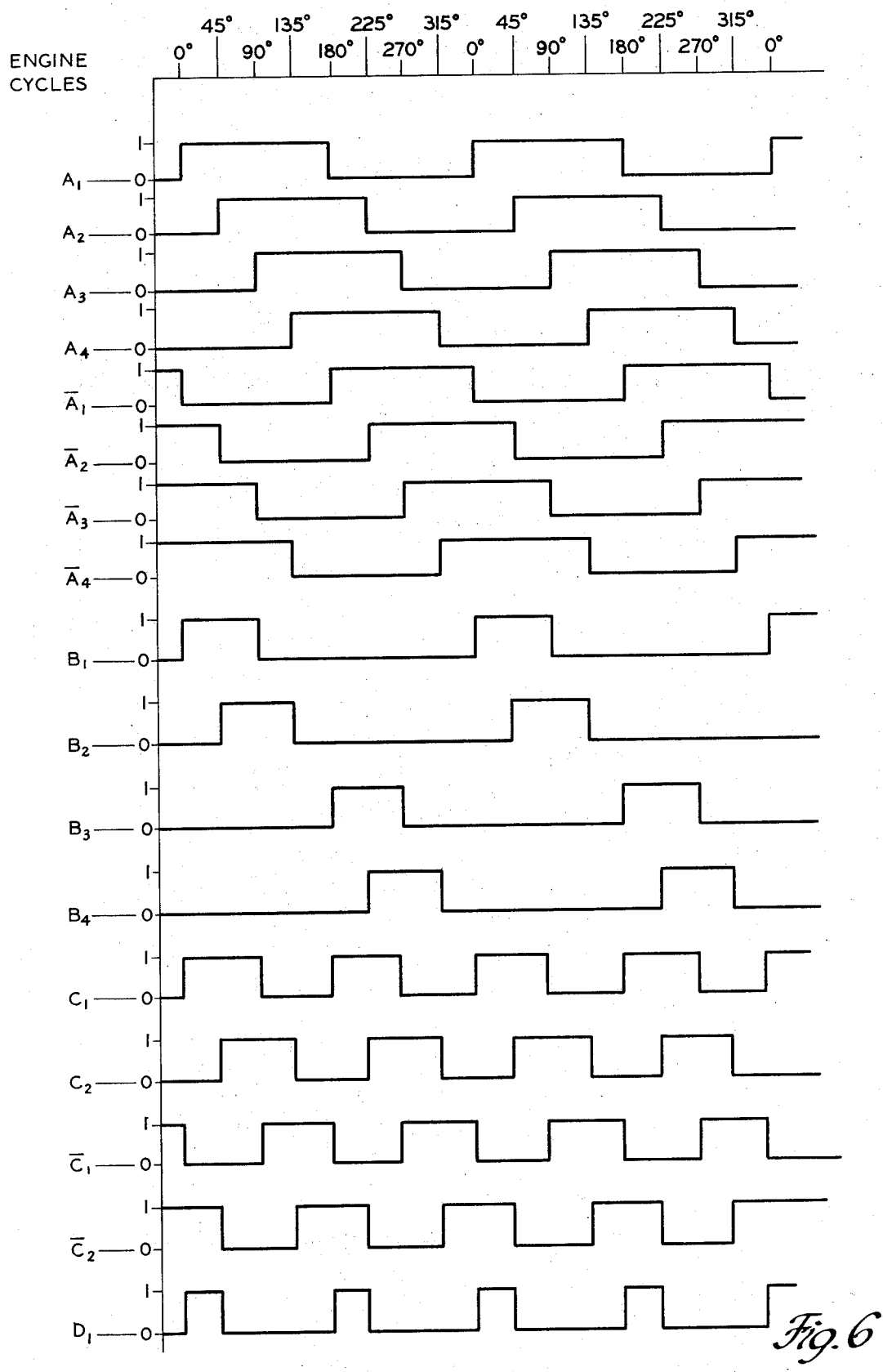
FIGS. 6 and 7 are graphic diagrams of several waveforms useful in explaining the principles of the invention.

Referring to FIGS. 5 and 6, the group of input windings $32_a$–$32_d$ of the pick-up transducer 24 are connected to corresponding ones of a group of four bistable multivibrators or flip-flops $38_a$–$38_d$, respectively. The flip-flops $38_a$–$38_d$ are responsive to the input signals $W_1$–$W_4$ to provide a corresponding set of four symmetrical timing signals $A_1$–$A_4$, respectively. The timing signals $A_1$–$A_4$ are square waves exhibiting periodic magnitude permutations or amplitude transitions between a high level and a low level. The timing signals $A_1$–$A_4$ may be expressed by the following equations:

$$A_1 = \uparrow W_1 \downarrow \tag{6}$$

$$A_2 = \uparrow W_2 \downarrow \tag{7}$$

$$A_3 = \uparrow W_3 \downarrow \tag{8}$$

$$A_4 = \uparrow W_4 \downarrow \tag{9}$$

Thus, the timing signals $A_1$–$A_4$ shift to the high level in response to the occurrence of the negative-to-positive polarity transitions in the first pulse pairs 34 of the input signals $W_1$–$W_4$, respectively. Alternatively, the timing signals $A_1$–$A_4$ shift to the low level in response to the occurrence of the positive-to-negative polarity transitions in the second pulse pairs 36 of the input signals $W_1$–$W_4$, respectively. As a result, the timing signals $A_1$–$A_4$ each contain two level transitions per engine cycle.

More particularly, in the timing signal $A_1$, a low-to-high level transition occurs at the 0° point and a high-to-low level transition occurs at the 180° point in each engine cycle marking the start of injection for the fuel injectors $V_1$ and $V_5$, respectively. In the timing signal $A_2$, a low-to-high level transition occurs at the 45° point and a high-to-low level transition occurs at the 225° point in each engine cycle marking the start of injection for the fuel injectors $V_2$ and $V_6$, respectively. In the timing signal $A_3$, a low-to-high level transition occurs at the 90° point and a high-to-low level transition occurs at the 180° point marking the start of injection for the fuel injectors $V_3$ and $V_7$, respectively. In the timing signal $A_4$, a low-to-high level transition occurs at the 135° point and a high-to-low level transition occurs at the 315° point in each engine cycle marking the start of injection for the fuel injectors $V_4$ and $V_8$, respectively. Accordingly, the magnitude permutations or amplitude transitions in the set of timing signals $A_1$–$A_4$ are successively spaced at intervals of 180° or one-half of an engine cycle within each of the timing signals $A_1$–$A_4$ and are successively displaced at intervals of 45° or one-eighth of an engine cycle between each of the timing signals $A_1$–$A_4$.

A group of four inverters $40_a$–$40_d$ is connected to the flip-flops $38_a$–$38_d$ as shown in FIG. 5. The inverters $40_a$–$40_d$ are responsive to the timing signals $A_1$–$A_4$ to produce timing signals $\overline{A}_1$–$\overline{A}_4$ equal to the inverse of the timing signals $A_1$–$A_4$, respectively.

A group of four AND gates $42_a$–$42_d$ is connected to the flip-flops $38_a$–$38_d$ and to the inverters $40_a$–$40_d$ as shown in FIG. 5. The AND gate $42_a$ is responsive to the timing signals $A_1$ and $\overline{A}_3$ to produce a timing signal $B_1$ and equal to the AND function of the timing signals $A_1$ and $\overline{A}_3$. The AND gate $42_b$ is responsive to the timing signals $A_2$ and $\overline{A}_4$ to produce a timing signal $B_2$ equal to the AND function of the timing signals $A_2$ and $\overline{A}_4$. The AND gate $42_c$ is responsive to the timing signals $\overline{A}_1$ and $A_3$ to produce a timing signal $B_3$ equal to the AND function of the timing signals $\overline{A}_1$ and $A_3$. The AND gate $42_d$ is responsive to the timing signals $\overline{A}_2$ and $A_4$ to produce a timing signal $B_4$ equal to the AND function of the timing signals $\overline{A}_2$ and $A_4$.

Collectively, the group of inverters $40_a$–$40_d$ and the group of AND gates $42_a$–$42_d$ are responsive to the set of first order timing signals $A_1$–$A_4$ to produce a first set of second order timing signals $B_1$–$B_4$ given by the following logical equations:

$$B_1 = A_1 \cdot \overline{A}_3$$
$$B_2 = A_2 \cdot \overline{A}_4$$
$$B_3 = \overline{A}_1 \cdot A_3$$
$$B_4 = \overline{A}_2 \cdot A_4$$

The pair of OR gates $44_a$ and $44_b$ are connected to the AND gates $42_a$–$42_d$ as shown in FIG. 5. The OR gate $44_a$ is responsive to the timing signals $B_1$ and $B_3$ to produce a timing signal $C_1$ equal to the OR function of the timing signals $B_1$ and $B_3$. The OR gate $44_b$ is responsive to the timing signals $B_2$ and $B_4$ to produce a timing signal $C_2$ equal to the OR function of the timing signals $B_2$ and $B_4$.

Collectively, the pair of OR gates $44_a$ and $44_b$ are responsive to the first set of second order timing signals $B_1$–$B_4$ to produce a second set of two second order timing signals $C_1$ and $C_2$ given by the following logical equations:

$$C_1 = B_1 + B_3$$
$$C_2 = B_2 + B_4$$

A pair of inverters $46_a$ and $46_b$ are connected to the OR gates $44_a$ and $44_b$ as shown in FIG. 5. The inverters $46_a$ and $46_b$ are responsive to the timing signals $C_1$ and $C_2$ to produce timing signals $\overline{C}_1$ and $\overline{C}_2$ equal to the inverse of the timing signals $C_1$ and $C_2$, respectively.

A group of four AND gates $48_a$–$48_d$ is connected to the OR gates $44_a$ and $44_b$ and to the inverters $46_a$ and $46_b$ as shown in FIG. 5. The AND gate $48_a$ is responsive to the timing signals $C_1$ and $\overline{C}_2$ to provide a timing signal $D_1$ equal to the AND function of the timing signals $C_1$ and $\overline{C}_2$. The AND gate $48_b$ is responsive to the timing signals $C_1$ and $C_2$ to provide a timing signal $D_2$ equal to the AND function of the timing signal $C_1$ and $C_2$. The AND gate $48_c$ is responsive to the timing signals $\overline{C}_1$ and $C_2$ to produce a timing signal $D_3$ equal to the AND function of the timing signals $\overline{C}_1$ and $C_2$. The AND gate $48_d$ is responsive to the timing signals $\overline{C}_1$ and $\overline{C}_2$ to produce a timing signal $D_4$ equal to the AND function of the timing signals $\overline{C}_1$ and $\overline{C}_2$.

Collectively, the pair of inverters $46_a$ and $46_b$ and the group of AND gates $48_a$–$48_d$ are responsive to the second set of second order timing signals $C_1$ and $C_2$ to produce a third set of four second order timing signals $D_1$–$D_4$ given by the following logical equations:

$$D_1 = C_1 \cdot \overline{C}_2$$
$$D_2 = C_1 \cdot C_2$$
$$D_3 = \overline{C}_1 \cdot C_2$$
$$D_4 = \overline{C}_1 \cdot \overline{C}_2$$

A single OR gate 50 is connected to the AND gates $48_b$ and $48_d$. The OR gate 50 is responsive to the timing signals $D_2$ and $D_4$ to provide a single timing signal E equal to the OR function of the timing signals $D_2$ and $D_4$. Alternately, the OR gate 50 may be connected to the AND gates $48_a$ and $48_b$. In such event, the timing signal E produced by the OR gate 50 is equal to the OR function of the timing signals $D_1$ and $D_3$. Thus, the OR gate 50 is responsive to the third set of second order timing signals $D_1$–$D_4$ to produce a single third order timing signal E given one of the following logical equations:

$$E = D_2 + D_4$$
$$E = D_1 + D_3$$

The timing signal E contains magnitude permutations or amplitude transitions successively spaced at intervals of 45° or one-eighth of an engine cycle. Accordingly, during each engine cycle, the timing signal E contains eight level transitions successively defining the start of injection for the fuel injectors $V_1$–$V_8$ in response to the eight level transitions per engine cycle collectively contained within the set of first order timing signals $A_1$–$A_4$.

Figure 7:
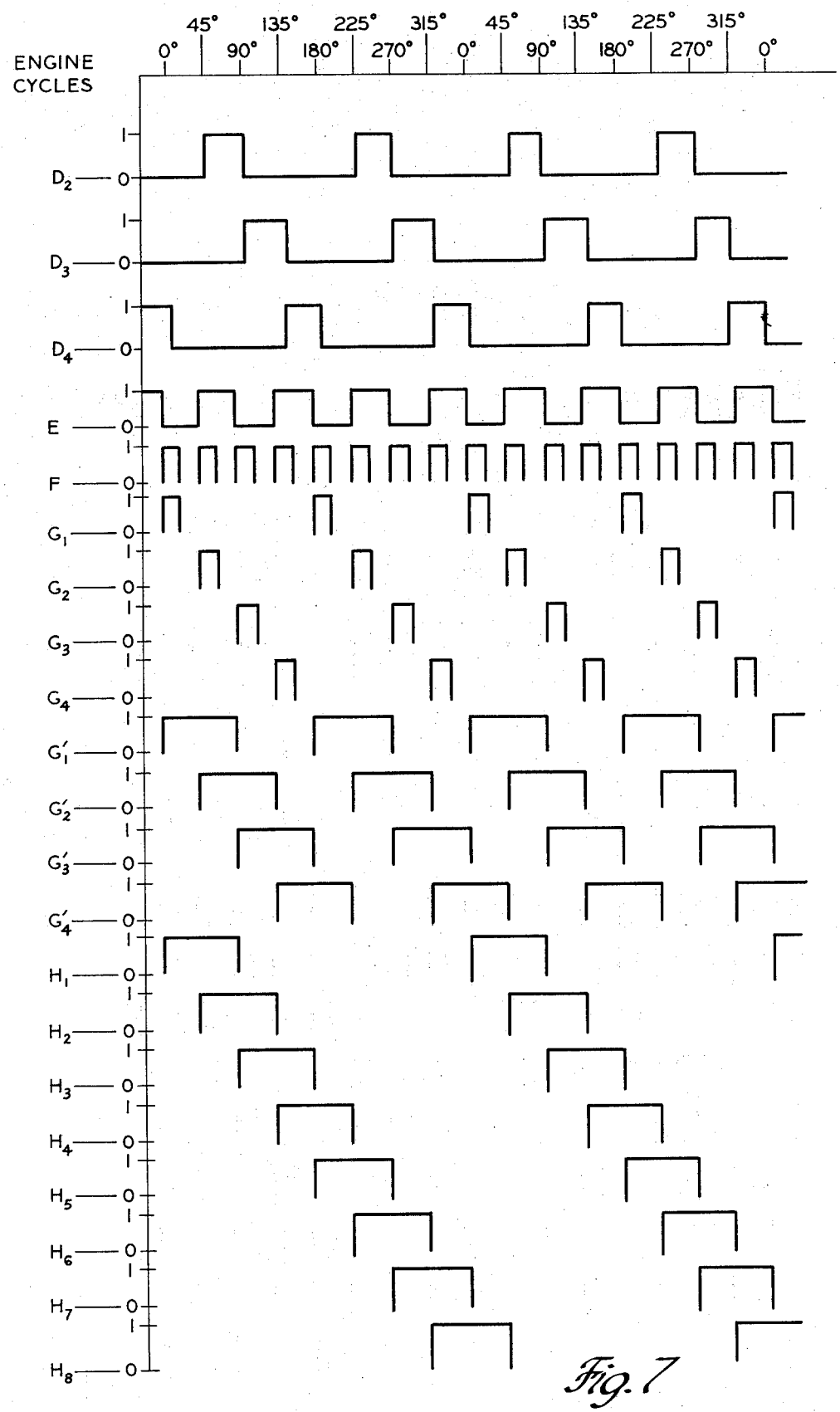

Referring to FIGS. 5, 6 and 7, the controller 20 is responsive to the single timing signal E to provide a single pulse train F containing eight bilevel control pulses per engine cycle synchronized with the eight level transitions per engine cycle in the single timing signal E. That is, the control pulses in the single pulse train F are each initiated in response to the occurrence of a level transition in the single timing signal E. As previously described, the occurrence of each of the eight level transitions in the timing signal F defines the start of injection for a corresponding one of the eight fuel injectors $V_1$–$V_8$ according to the injection order during each engine cycle. The duration of each of the eight control pulses defines the period of injection for a corresponding one of the fuel injectors $V_1$–$V_8$ according to the injection order during each engine cycle. The controller 20 determines the duration of each of the control pulses in the single pulse train F as a function of at least one operating parameter of the engine 10, such as manifold pressure or throttle position. Since the controller 20 is only incidental to the present invention, it is not described in detail. For a detailed description of one embodiment of the controller 20, reference may be made to U.S. Pat. No. 3,606,869.

In order to achieve satisfactory performance in most V-8 engines such as the engine 10, it is necessary that the period of injection for the fuel injectors $V_1$-$V_8$ approach a maximum duration of 180° or one-half of an engine cycle at relatively high speeds and relatively high loads. In other words, the individual injection periods of the fuel injectors $V_1$-$V_8$ must overlap one another. However, the control pulses in the single pulse train F cannot overlap one another. The maximum time available between successive level transitions in the single timing signal E is 45° or one-eighth of an engine cycle. Consequently, the controller 20 determines the duration of the control pulses in the single pulse train F as a fraction or a percentage of the maximum time available between successive level transitions in the single timing signal E. As a result, the duration of the control pulses in the single pulse train F is less than the desired period of injection for the fuel injectors $V_1$-$V_8$ by a factor of four.

A group of four AND gates $52_a$-$52_d$ is connected to the controller 20 and to the inverters $50_1$-$50_d$ as shown in FIG. 5. The AND gate $52_a$ is responsive to the pulse train F and to the timing signal $D_1$ to produce a pulse train $G_1$ equal to the AND function of the pulse train F and the timing signal $D_1$. The AND gate $52_b$ is responsive to the pulse train F and to the timing signal $D_2$ to produce a pulse train $G_2$ equal to the AND function of the pulse train F and the timing signal $D_2$. The AND gate $52_c$ is responsive to the pulse train F and to the timing signal $D_3$ to produce a pulse train $G_3$ equal to the AND function of the pulse train F and the timing signal $D_3$. The AND gate $52_d$ is responsive to the pulse train F and to the timing signal $D_4$ for producing a pulse train $G_4$ equal to the AND function of the pulse train F and the timing signal $D_4$.

Collectively, the group of AND gates $52_a$-$52_d$ is responsive to the single third pulse train F and the third set of second order timing signals $D_1$-$D_4$ to provide a set of four second order pulse trains $G_1$-$G_4$ given by the following logical equations:

$$G_1 = F \cdot D_1$$
$$G_2 = F \cdot D_2$$
$$G_3 = F \cdot D_3$$
$$G_4 = F \cdot D_4$$

Since the control pulses in the second set of pulse trains $G_1$-$G_4$ are initiated at intervals of 180° or one-half of an engine cycle, the duration of the control pulses may now be extended. A group of four multipliers $54_a$-$54_d$ is connected to the AND gates $52_a$-$52_d$ as shown in FIG. 5. The multipliers $54_a$-$54_d$ are responsive to the pulse trains $G_1$-$G_4$ to extend the duration of the control pulses contained within the pulse trains $G_1$-$G_4$ by a factor of four, respectively, thereby to provide a corresponding set of four multiplied pulse trains $G_1'$-$G_4'$. As a result, the actual duration of the control pulses in the set of multiplied pulse trains $G_1'$-$G_4'$ conforms with the desired period of injection for the fuel injectors $V_1$-$V_8$ as determined by the controller 20 in response to operation of the engine 10. The set of second order multiplied pulse trains $G_1'$ and $G_4'$ may be expressed by the following logical equations:

$$G_1' = (4) G_1$$
$$G_2' = (4) G_2$$
$$G_3' = (4) G_3$$
$$G_4' = (4) G_4$$

Due to the extension of the duration of the control pulses in the set of second order pulse trains $G_1$-$G_4$ by the multipliers $54_a$-$54_d$, the control pulses in the pulse trains $G_1'$-$G_4'$ may overlap one another. The total number of other control pulses overlapped by any one of the control pulses in the pulse trains $G_1'$-$G_4'$ is dependent upon the overal duration of the control pulses. Further, since the multiplication factor is four (4), the maximum duration of the control pulses in the pulse trains $G_1'$-$G_4'$ approaches 180° or one-half of an engine cycle as the duration of the control pulses in the pulse trains $G_1$-$G_4$ approaches 45° or one-eighth of an engine cycle. Hence, in the illustrated electronic fuel injection system, the maximum practical multiplication factor is four. However, it will be appreciated that the multiplication factor may be less than four if desired.

A group of eight AND gates $56_a$-$56_h$ is connected with the group of flip-flops $38_a$-$38_d$, with the group of inverters $40_a$-$40_d$, and with the group of multipliers $54_a$-$54_d$ as shown in FIG. 5. The AND gate $54_a$ is responsive to the pulse train $G_1'$ and to the timing signal $A_1$ to produce a pulse train $H_1$ equal to the AND function of the pulse train $G_1'$ and the timing signal $A_1$. The AND gate $56_b$ is responsive to the pulse train $G_2'$ and to the timing signal $A_2$ to produce a pulse train $H_2$ equal to the AND function of the pulse train $G_2'$ and the timing signal $A_2$. The AND gate $56_c$ is responsive to the pulse train $G_3'$ and to the timing signal $A_3$ to produce a pulse train $H_3$ equal to the AND function of the pulse train $G_3'$ and the timing signal $A_3$. The AND gate $56_d$ is responsive to the pulse train $G_4'$ and to the timing signal $A_4$ to produce a pulse train $H_4$ equal to the AND function of the pulse train $G_4'$ and the timing signal $A_4$. The AND gate $56_e$ is responsive to the pulse train $G_1'$ and to the timing signal $\overline{A_1}$ to produce a pulse train $H_5$ equal to the AND function of the pulse train $G_1'$ and the timing signal $\overline{A_1}$. The AND gate $56_f$ is responsive to the pulse train $G_2'$ and to the timing signal $\overline{A_2}$ to produce a pulse train $H_6$ equal to the AND function of the pulse train $G_2'$ and the timing signal $\overline{A_2}$. The AND gate $56_g$ is responsive to the pulse train $G_3'$ and to the timing signal $\overline{A_3}$ to produce a pulse train $H_7$ equal to the AND function of the pulse train $G_3'$ and the timing signal $\overline{A_3}$. The AND gate $56_h$ is responsive to the pulse train $G_4'$ and to the timing signal $\overline{A_4}$ to produce a pulse train $H_8$ equal to the AND function of the pulse train $G_4'$ and to the timing signal $\overline{A_4}$.

Collectively, the group of AND gates $56_a$-$56_h$ and the group of inverters $40_a$-$40_d$ are responsive to the set of second order multiplied pulse trains $G_1'$-$G_4'$ and to the set of first order timing signals $A_1$-$A_4$ to produce a series of eight first order pulse trains $H_1$-$H_8$ given by the following logical equations:

$$H_1 = G_1' \cdot A_1$$
$$H_2 = G_2' \cdot A_2$$
$$H_3 = G_3' \cdot A_3$$
$$H_4 = G_4' \cdot A_4$$
$$H_5 = G_1' \cdot \overline{A_1}$$
$$H_6 = G_2' \cdot \overline{A_2}$$
$$H_7 = G_3' \cdot \overline{A_3}$$
$$H_8 = G_4' \cdot \overline{A_4}$$

The control pulses in the series of first order pulse trains $H_1$–$H_8$ are successively initiated at intervals of 360° or one engine cycle within each of the pulse trains $H_1$–$H_8$, and are successively displaced at intervals of 45° or one-eighth of an engine cycle between each of the pulse trains $H_1$–$H_8$. Hence, the eight pulse trains $H_1$–$H_8$ each contain control pulses for a corresponding one of the eight fuel injectors $V_1$–$V_8$. Further, the control pulses in any one of the pulse trains $H_1$–$H_8$ may overlap the control pulses in a maximum of six other ones of the pulse trains $H_1$–$H_8$ dependent upon the duration of the control pulses.

A group of eight pulse amplifiers $58_a$–$58_h$ is connected between corresponding ones of the AND gates $56_a$–$56_h$ and corresponding ones of the fuel injectors $V_1$–$V_8$, respectively, for amplifying the magnitude or the level of the control pulses in the pulse trains $H_1$–$H_8$. Moreover, the pulse amplifiers $58_a$–$58_h$ apply the pulse trains $H_1$–$H_8$ to energize corresponding ones of the fuel injectors $V_1$–$V_8$ for the duration of the control pulses in the pulse trains $H_1$–$H_8$. Preferably, each of the fuel injectors $V_1$–$V_8$ is provided by an electromagnetic valve having a plunger which is driven to a fully opened position against a spring bias when a solenoid is energized in response to the presence of a control pulse and which is driven to a fully closed position by the spring bias when the solenoid is deenergized in response to the absence of a control pulse. Thus, the fuel injectors $V_1$–$V_8$ are opened for the duration of the control pulses in the pulse trains $H_1$–$H_8$ to inject fuel at a constant rate to the cylinders 1–8 of the engine 10.

It is to be noted that the illustrated embodiment of the invention is shown for demonstrative purposes only, and that various alterations and modifications may be made to it without departing from the spirit and scope of the invention.

What is claimed is:

1. In an interval combustion engine system including a group of eight fuel injection units for applying fuel to the engine when energized in a given injection order during each engine cycle, the combination comprising: means responsive to the operation of the engine for generating a set of four first order timing signals $A_1$, $A_2$, $A_3$ and $A_4$, each having alternate level transitions spaced at intervals of one-half engine cycle within each of the timing signals $A_1$–$A_4$ and displaced at intervals of one-eighth engine cycle between each of the timing signals $A_1$–$A_4$; means responsive to the set of first order timing signals $A_1$–$A_4$ for producing a first set of four second order timing signals $B_1$, $B_2$, $B_3$ and $B_4$ given by the following logical equations:

$$B_1 = A_1 \cdot \overline{A_3}$$
$$B_2 = A_2 \cdot \overline{A_4}$$
$$B_3 = \overline{A_1} \cdot A_3$$
$$B_4 = \overline{A_2} \cdot A_4;$$

means responsive to the first set of second order timing signals $B_1$–$B_4$ for producing a second set of two second order timing signals $C_1$ and $C_2$ given by the following logical equations:

$$C_1 = B_1 + B_3$$
$$C_2 = B_2 + B_4;$$

means responsive to the second set of second order timing signals $C_1$ and $C_2$ for producing a third set of four second order timing signals $D_1$, $D_2$, $D_3$ and $D_4$ given by the following logical equations:

$$D_1 = C_1 \cdot \overline{C_2}$$
$$D_2 = C_1 \cdot C_2$$
$$D_3 = \overline{C_1} \cdot C_2$$
$$D_4 = \overline{C_1} \cdot \overline{C_2};$$

means responsive to the third set of second order timing signals $D_1$–$D_4$ for producing a single third order timing signal E given by one of the following logical equations:

$$E = D_1 + D_3$$
$$E = D_2 + D_4;$$

means responsive to the third order timing signal E for producing a single third order pulse train F containing control pulses initiated at intervals of one-eighth engine cycle in response to each level transition in the timing signal E, the means connected to the engine for defining the duration of the control pulses in the pulse train F as a function of at least one engine operating parameter up to a maximum of approximately one-eighth engine cycle; means responsive to the third order pulse train F and to the third set of second order timing signals $D_1$–$D_4$ for producing a set of four second order pulse trains $G_1$, $G_2$, $G_3$ and $G_4$ given by the following logical equations:

$$G_1 = F \cdot D_1$$
$$G_2 = F \cdot D_2$$
$$G_3 = F \cdot D_3$$
$$G_4 = F \cdot D_4;$$

means responsive to the set of second order pulse trains $G_1$–$G_4$ for extending the duration of the control pulses within the pulse trains $G_1$–$G_4$ by a maximum factor of four (4) to provide a set of four second order trains $G_1'$, $G_2'$, $G_3'$ and $G_4'$ containing control pulses having a maximum duration of approximately one-half engine cycle; means responsive to the set of second order pulse trains $G_1'$–$G_4'$ and the set of first order timing signals $A_1$–$A_4$ for producing a series of eight first order pulse trains $H_1$, $H_2$, $H_3$, $H_4$, $H_5$, $H_6$, $H_7$ and $H_8$ given by the following logical equations:

$$H_1 = G_1' \cdot A_1$$
$$H_2 = G_2' \cdot A_2$$
$$H_3 = G_3' \cdot A_3$$
$$H_4 = G_4' \cdot A_4$$
$$H_5 = G_1' \cdot \overline{A_1}$$
$$H_6 = G_2' \cdot \overline{A_2}$$
$$H_7 = G_3' \cdot \overline{A_3}$$
$$H_8 = G_4' \cdot \overline{A_4};$$

and means for applying the series of first order pulse trains $H_1$–$H_8$ to corresponding ones of the group of fuel injection units to energize the fuel injection units for the duration of the control pulses in the pulse trains $H_1$–$H_8$.

* * * * *

PO-1050
(5/69)

UNITED STATES PATENT OFFICE
CERTIFICATE OF CORRECTION

Patent No. 3,824,969      Dated July 23, 1974

Inventor(s) Lamonte R. Edison

It is certified that error appears in the above-identified patent and that said Letters Patent are hereby corrected as shown below:

Column 4, line 19, "shape" should be -- sharp --;
Column 9, line 22, after "four" (4) should be inserted;
Column 10, lines 23 and 24, after "four" -- (4) -- should be inserted;
Column 10, line 29, "$54_a$" should be -- $56_a$ --;
Column 11, line 1 of Claim 1, "interval" should be -- internal and
Column 12, line 58, after "order" insert -- pulse --.

Signed and Sealed this nineteenth Day of August 1975

[SEAL]

Attest:

RUTH C. MASON
*Attesting Officer*

C. MARSHALL DANN
*Commissioner of Patents and Trademarks*